March 28, 1950     C. L. KUBISTA     2,501,727
DRINKING FOUNT FOR POULTRY
Filed March 25, 1946
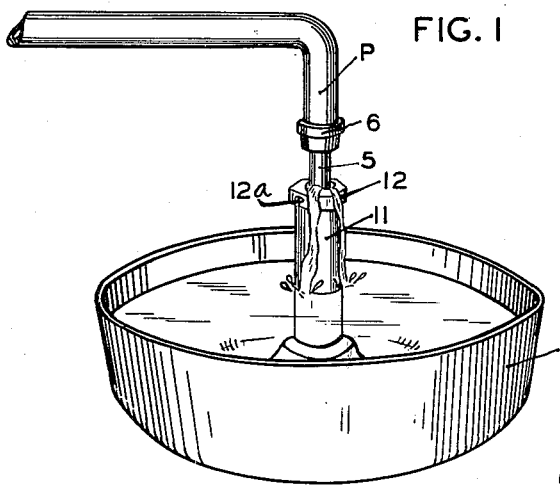
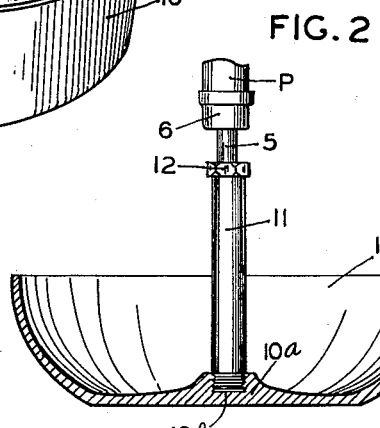
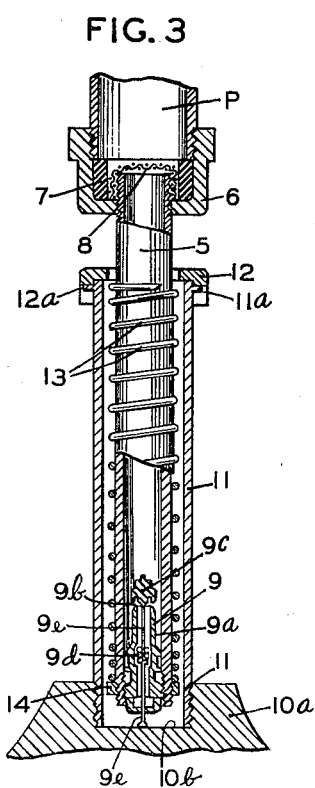
INVENTOR
CHARLES L. KUBISTA
BY
*Williamson & Williamson*
ATTORNEYS Patented Mar. 28, 1950

2,501,727

UNITED STATES PATENT OFFICE 2,501,727

DRINKING FOUNT FOR POULTRY

Charles L. Kubista, Owatonna, Minn.

Application March 25, 1946, Serial No. 656,894

4 Claims. (Cl. 137—68)

This invention relates to drinking founts for poultry and domestic animals.

Heretofore, such founts or watering devices have generally required support or guide means from the ground or floor and have usually relied upon a float-actuated device for maintaining the water at a predetermined level. Most float-operated valves of the prior art devices were susceptible to breakage, bending or maladjustment and ground supports and guiding means required removal thereof and often, temporary disconnection of the water supply for cleaning of the device and for cleaning of the supporting floor or ground on which the animal stood to drink from the fount.

It is an object of my present invention to provide an extremely simple, inexpensive and highly efficient drinking fount for poultry, livestock and other animals which comprises a minimum number of parts and which is entirely supported from an overhead pipe or other overhead support having a water supply associated therewith.

A further object is the provision of a simplified overhanging drinking fount which dispenses with float mechanisms for controlling the level of the water in the drinking bowl; which may not be injured, maladjusted or displaced by ordinary bumping of an animal thereagainst and which may be quickly and easily removed for cleaning or sterilization of the parts.

More specifically, it is an object to provide a drinking fount of the class described wherein the entire device and its working parts are supported in overhanging relation to the floor or ground from a pipe or conduit-equipped hanger and wherein the drinking receptacle is mounted for relative vertical movement upon a depending water conduit with valve means interposed in said conduit and simple resilient means interposed between the conduit and the receptacle to cause the valve to be opened until accumulation of water in the receptacle has reached a predetermined weight, whereafter the valve is closed.

A still further object is the provision of mechanism of the type previously described wherein relative swinging between the supported receptacle and the depending and supporting conduit is prevented by the inherent construction of the connections between the two and does not require any supporting base or guide means associated with the receptacle from beneath.

These and other objects and advantages of my invention will be more apparent from the following description made in connection with the accompanying drawings, wherein like reference characters refer to similar parts throughout the several views and in which:

Fig. 1 is a perspective view showing a form of my invention suspended in operative position above a floor or the ground;

Fig. 2 is a vertical section taken axially of the receptacle and showing the supporting conduit and the upper portion of the mounting sleeve in full; and Fig. 3 is a similar detail sectional view showing the lower portion of the supporting supply pipe and the upper and lower portions of the supporting conduit in vertical section.

My entire device is adapted to be supported from the depending end of a rigid water supply pipe P which is suitably affixed to a wall or post and terminates in spaced relation to the ground or a supporting floor.

My improved fount includes a relatively short, vertical supporting conduit 5 threadedly connected at its upper end as shown, with an enlarged coupling nut 6, which nut is internally threaded to engage and be secured to the externally threaded extremity of depending pipe P. A suitable washer 7 is carried within nut 6 adapted to abut the end extremity of pipe P and to seal the joint between said pipe and conduit 5. I prefer to provide the upper open end of my supporting conduit 5 with a strainer cap 8 which may be constructed of metal screening or other foraminous straining material. Conduit 5 is preferably constructed of rigid metal and terminates in a lower open end, being as shown, both internally and externally threaded. The internal diameter of conduit 5 is preferably similar to that of the filling tube of an automotive tire which enables a valve mechanism, indicated as an entirety by the numeral 9, of the pneumatic tire type to be readily installed therein, said valve mechanism having the usual axially disposed valve guide 9a terminating in its upper end in an annular seat 9b against which the valve body 9c is adapted to seat, normally urged to closed position by a coil spring 9d which surrounds the medial portion of the longitudinal valve stem 9e and is mounted in a medial chamber of the valve guide and interposed between a restricted shoulder afforded thereby and a pair of lugs pressed from the stock of the medial portion of the stem and disposed below said spring. The outer end of the stem 9e projects outwardly of the lower end of supporting conduit 5 in position to be abutted upwardly to open the said valve.

I provide a suitable open-topped drinking receptacle which, as shown, is in the form of a symmetrical bowl 10 having an axial boss 10a in the bottom thereof, said boss being axially recessed and internally threaded to receive and threadedly secure the lower end of a mounting sleeve 11 which is disposed concentrically and in spaced relation to the supporting conduit 5. The central recessed portion of boss 10a provides a horizontal abutment surface 10b adapted to be thrust against the lower extremity of the valve stem 9e and extends perpendicularly to said stem. Mounting sleeve 11 is somewhat shorter than the supporting conduit 5 and is provided at its upper end with a quickly detachable abutment cap 12 centrally apertured in its top for accommodation with working clearance of the upper portion of conduit 5. The depending, annular flange of abutment cap 12 in the form of the invention shown, is provided with a pair of diametrically opposite, upwardly extending bayonet joint slots 12a which are adapted to receive a pair of outwardly and laterally projecting bayonet joint pins 11a provided at opposite sides of the upper end of mounting sleeve 11. An elongated coil spring 13 surrounds supporting conduit 5 and is housed by mounting sleeve 11 being interposed between the abutment cap 12 of the mounting sleeve and an adjustment collar 14, threadedly connected with the lower externally threaded end of supporting conduit 5. Adjustment collar 14 is of circular shape and its periphery is spaced with adequate working clearance from the internal cylindrical wall of sleeve 11 and to further allow free passage of water upwardly through the sleeve. The tension of coil spring 13 is such as to overbalance the weight of receptacle 10 and mounting sleeve 11 when the receptacle is partially filled with water, whereby the sleeve 11 and supported receptacle are normally elevated relative to the supporting conduit 5 until such time as accumulated water within the bowl reaches a predetermined weight and consequently, level. In this connection, the collar 14 at the lower end of the depending supporting conduit may be threadedly adjusted to increase or decrease the tension on coil spring 13, thereby providing for variance in the level of water to be maintained within bowl 10.

In operation, when the receptacle 10 is empty or partially filled, the working parts of my device will be disposed substantially as shown in Fig. 3. Here, it will be noted that the tension of coil spring 13 holds the mounting sleeve 11 with the supported bowl in substantially maximum elevated relation to the lower end of the supporting conduit 5. In such relation the valve stem 9e is abutted by the perpendicular abutment surface 10b in the boss of the receptacle whereby the valve 9c is lifted from its seat and liquid will flow downwardly through conduit 5 and discharge from the lower open end thereof, whereafter this liquid will flow upwardly through the mounting sleeve 11 and overflow the upper end and abutment cap 12 carried thereby, producing a gentle flow of water down the outside of the mounting sleeve into the bowl, as shown in Fig. 1.

Water or liquid food will flow and accumulate in bowl 10 until such time as the aggregate weight of the bowl and its mounting sleeve 11 and the liquid contained therein, is sufficient to lower the bowl against the tension of coil spring 13 to a point where upward abutment pressure on the extremity of valve stem 9e is released to permit the spring 9d of the valve to close the same against its seat.

Thus, with a predetermined seating of the tension adjusting collar 14, a predetermined level of water or other liquid is maintained in the bowl.

The entire device, it will be noted, is supported and guided from its inherent parts including the depending supporting conduit 5 and the concentric mounting sleeve 11 telescoped thereover. No guiding means or supports are required beneath the bowl and consequently the ground or floor beneath the bowl and on which the fowl or animals stand may be readily cleaned without moving the device.

My improved fount employs no float or critically adjustable parts requiring constant cleaning. When it is occasionally desired to clean the bowl as well as the working parts, the abutment cap 12 is very quickly released from its engagement with the diametric pins 11a whereby the bowl and its mounting sleeve may be readily lowered and removed. In this connection, it should be noted that upon removal and release of the connection of abutment cap 12, the valve in the lower end of conduit 5 immediately closes whereby there will be no dripping or wastage of fluid.

It will further be noted that if a fowl or domestic animal nudges or strikes the bowl, the displacement thereof is exceedingly limited by the spaced relation between the concentric mounting of conduit 5 and mounting sleeve 11, the coil spring 13 cushioning the impact of such shocks and the relationship of the supporting conduit 5, sleeve 11 and coil spring 13 preventing the bowl from tipping or tilting and consequently, overflowing or splashing its contents.

It will further be noted that when the bowl is bumped, the same is free with its mounting sleeve to oscillate upon the supporting conduit 5 whereby damage is substantially eliminated due to jolts or bumping.

It will of course, be understood that various changes may be made in the form, details, arrangement and proportions of the parts without departing from the scope of my invention.

What I claim is:

1. A fount for poultry and domestic animals having in combination a depending supporting conduit having a discharge opening in the lower portion thereof, a valve of the pneumatic tire type mounted in the lower end of said conduit and having a stem projecting from the lower extremity of said conduit, an open-topped receptacle having an upstanding conduit-embracing mounting fixedly secured at one end to the bottom of the receptacle, said mounting having a bearing surface for telescoping over and loosely fitting the depending portion of said conduit, said conduit having a coil spring abutment means disposed externally above the lower end thereof, and said mounting adjacent its upper end having a conduit surrounding portion forming coil spring abutment means, a coil spring surrounding said conduit disposed within said mounting and interposed between said pair of spring abutment means, said spring being of a tension to overcome the weight of said receptacle when the latter is empty, at which time upward displacement of said mounting will be effected to open said valve, the weight of a predetermined quantity of accumulated liquid in said receptacle being adapted to react to compress said coil spring and to axially lower said mounting relative to said conduit to relieve upward pressure from said valve stem.

2. A fount for poultry and domestic animals including a fixed depending supporting conduit having a discharge opening in the lower portion thereof, a valve mounted in the lower portion of said conduit for movement axially thereof, means urging the valve outwardly to closed position, said valve having a stem that projects beyond the lower end of the conduit when the valve is in closed position, an open-topped receptacle having an upstanding mounting fixedly secured at one end to the bottom central portion of the receptacle and projecting upwardly therefrom, the mounting having an opening at its other end and extending about a portion of said conduit, said receptacle being entirely open at the top outwardly of said central mounting, the receptacle having an abutment surface opposed to the valve stem for lifting the valve to open the same upon upward movement of the receptacle and said mounting relatively to the fixed conduit, the conduit having abutment means externally above the lower end thereof, and the mounting having abutment means at the upper part thereof, and a coil spring surrounding the conduit interposed between said abutment means, said spring when the receptacle is empty acting to lift the same relatively to the conduit at which time upward displacement of the mounting will be effected to open the valve, the weight of a predetermined quantity of accumulated liquid in said receptacle being adapted to react to compress the coil spring so that the mounting will be lowered relatively to the conduit to relieve upward pressure by the receptacle upon the valve stem, thereby permitting the valve to be closed.

3. A fount for poultry and domestic animals including a fixed depending supporting conduit having a discharge opening in the lower portion thereof, a valve mounted in the lower portion of said conduit, means urging the valve to closed position, said valve having an actuating portion projecting beyond the lower end of the conduit when the valve is in closed position, an open-topped receptacle having an upstanding mounting fixedly secured at one end to the bottom central portion of the receptacle and projecting upwardly therefrom, the mounting having an opening at its other end and extending about a portion of said conduit, said receptacle being entirely open at the top outwardly of said central mounting, the receptacle having an abutment surface opposed to the actuating portion of the valve for moving the valve to open the same upon upward movement of the receptacle and said mounting relatively to the fixed conduit, the conduit having abutment means externally above the lower end thereof, and the mounting having abutment means at its upper part, and a coil spring surrounding the conduit interposed between the said abutment means, said spring when the receptacle is empty acting to lift the receptacle relatively to the conduit at which time upward displacement of the mounting will be effected to open the valve, the weight of a predetermined quantity of accumulated liquid in said receptacle being adapted to react to compress the coil spring so that the mounting will be lowered relatively to the conduit to relieve upward pressure by the receptacle upon the actuating portion of the valve, thereby permitting the valve to be closed.

4. A fount for poultry and domestic animals including a fixed depending supporting conduit having a discharge opening in the lower portion thereof, a valve mounted in the lower portion of said conduit for movement axially thereof, means urging the valve outwardly to closed position, said valve having a stem that projects beyond the lower end of the conduit when the valve is in closed position, an open-topped receptacle having an upstanding mounting sleeve fixedly secured at one end to the bottom central portion of the receptacle and projecting upwardly therefrom, said mounting sleeve being of larger diameter than said conduit and loosely telescoped thereover in spaced relation thereto, said receptacle being entirely open at the top outwardly of said central mounting sleeve, the receptacle having an abutment surface opposed to the valve stem for lifting the valve to open the same upon upward movement of the receptacle and said mounting sleeve relatively to the fixed conduit, the conduit having abutment means externally above the lower end thereof, and the mounting sleeve having abutment means at the upper part thereof, and a coil spring surrounding the conduit disposed within said mounting sleeve and interposed between said abutment means, said spring when the receptacle is empty acting to lift the same relatively to the conduit at which time upward displacement of the mounting sleeve will be effected to open the valve, the weight of a predetermined quantity of accumulated liquid in said receptacle being adapted to react to compress the coil spring so that the mounting will be lowered relatively to the conduit to relieve upward pressure by the receptacle upon the valve stem, thereby permitting the valve to be closed.

CHARLES L. KUBISTA.

REFERENCES CITED

The following references are of record in the file of this patent:

UNITED STATES PATENTS

| Number | Name | Date |
|---|---|---|
| 1,800,045 | Bates | Apr. 7, 1931 |
| 2,107,573 | Langdon et al. | Feb. 8, 1938 |